Figure 1:
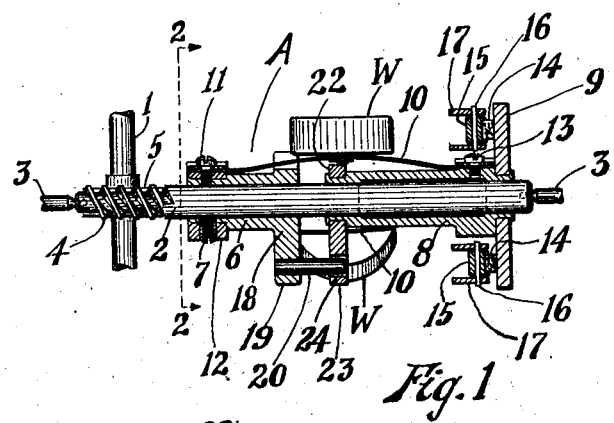

May 11, 1926.

T. A. EDISON

CENTRIFUGAL SPEED GOVERNOR

Filed Nov. 14, 1923

1,583,783

INVENTOR
Thomas A. Edison
BY Henry Lanahan
ATTORNEY

Patented May 11, 1926.

1,583,783

UNITED STATES PATENT OFFICE.

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

CENTRIFUGAL SPEED GOVERNOR.

Application filed November 14, 1923. Serial No. 674,785.

My invention relates to centrifugal speed governors and more particularly to those of the type designed for use in connection with phonographs or the like, where it is important that the record support or other motor driven member may be rotated at an almost absolutely uniform speed.

The principal objects of my invention are to provide a governor of this character which is extremely sensitive to speed variations and highly effective in maintaining a uniform speed of the motor driven device to which it may be appiled.

Figure 2:
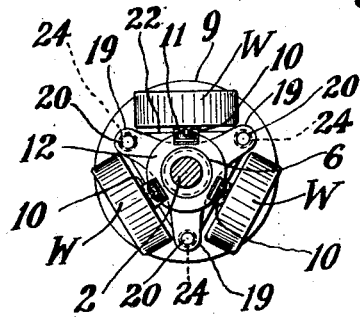

In order that my invention may be more clearly understood, attention is directed to the drawing accompanying and forming a part of this specification, and in which:

Figure 1 is a longitudinal sectional view, partly in elevation, showing a centrifugal governor in accordance with the present invention, and Figure 2 is a sectional view taken on the line 2, 2 of Figure 1 looking in the direction of the arrows.

Referring to the drawing, reference character 1 designates a vertical spindle, such as the spindle supporting the turntable of a phonograph, which may be driven by a spring motor or any other suitable motive means (not shown). The shaft 2 of the governor, designated generally by reference character A, is supported at its ends by bearings 3, 3 and is provided with a worm 4 meshing with a worm wheel 5 on the spindle 1, whereby the latter imparts rotation to the shaft 2. A collar or sleeve 6 is mounted on the shaft 2 and is fixedly secured thereto as by means of a set screw 7; and a second collar or sleeve 8 is slidably mounted on the shaft 1 for movement towards and from the collar 6 and has secured to the end thereof remote from the collar 6 a friction brake disk 9 preferably formed of glass-hardened steel and provided with a ground and highly polished friction surface.

The collars 6 and 8 are connected by suitable flexible weighted means, this means as shown comprising a plurality of bowed, flat spring arms or members 10 having centrifugal weights W suitably secured thereto approximately midway of their length. The bowed spring arms 10 extend longitudinally of the governor shaft 2 and are suitably secured at one end, as by means of set screws 11, to the sleeve 6, or to a collar 12 fast on such sleeve, adjacent the end thereof remote from the sleeve 8, and at their other end as by means of set screws 13 to the collar or sleeve 8 adjacent the brake disk 9. The friction surface of the brake disk 9 is normally engaged at diametrically opposite points by friction brake shoes 14, preferably formed of felt or felt-like material, mounted in suitable carriers 15 which are supported at 16 for independent movement about an axis at right angles to the axis of the governor shaft on the arms 17 of a common form of pivotally mounted equalizing yoke or fork (not shown in its entirety), which fork may be adjusted, in a manner well known, to regulate the pressure with which the brake shoes 14 engage the friction disk 9 and thereby the speed of the phonograph or other motor driven device controlled by the governor.

When the shaft 1 rotates, the governor will be rotated at a high speed by reason of the engagement of the worm wheel 5 on spindle 1 with the worm 4 on the governor shaft 2. The weights W will then move outwardly with respect to the axis of the governor shaft 2 under the action of centrifugal force, and effect sliding movement of the sleeve or collar 8 on the shaft 2 towards the sleeve 6 and thereby force the friction brake disk 9 against the brake shoes 14 in a manner well known. When a governor of the construction above described, is in operation, rotary movement is transmitted to the slidable collar or sleeve 8 from the sleeve 6 fixed to the shaft 2 through the weighted spring arms 10, the moment exerted at any time on the collar 8 in producing such rotary movement of the latter actually being equivalent to a certain force applied through a leverage substantially equal to the distance of the centrifugal weights W or of points in the arms 10 midway of their length, from the shaft 2. It will be apparent that the spring arms 10 in thus transmitting rotary movement to the collar or sleeve 8, will, in the absence of any means for preventing turning movement of collar 8 with respect to the collar 6 and shaft 2, be constantly subjected to a considerable twisting or torsional stress the amount of which will be dependent upon the friction resulting from the engagement of the brake shoes 14 with the disk 9. The twisting or torsional stress to which the arms 10 are subjected will be momentarily greatly increased whenever the speed of the governor shaft 2 is suddenly changed because of the fact that said arms will then be called upon to transmit, for a short time, a force sufficient to overcome the effect of the inertia of weights W, collar 8 and disk 9. The twisting or torsional stress to which the spring arms of a governor constructed as described, are thus subjected is sometimes sufficient to twist these arms to such an extent as to result in very uneven and unsatisfactory operation of the governor. To obviate this objection, I have provided a simple construction for effectually preventing relative turning movement of the governor shaft 2 and the slidable collar or sleeve 8, and which at the same time imposes such a very slight frictional resistance to sliding movement of said sleeve on shaft 2 as to render the governor extremely sensitive to speed variations. This construction, as embodied in the form of my invention illustrated, comprises a flange 18 formed on the inner end of the fixed collar 6 and provided with a plurality of radial arms 19 respectively extending outwardly between the weights W and spring arms 10, a plurality of pins 20 respectively fixed at one end to the radial arms 19 adjacent the outer ends of the latter, and a flat member or plate 22 suitably fixed to the inner end of the collar 8 and having radially extending portions 23 corresponding to the radial arms 19 and provided adjacent their outer ends with openings 24 with which the pins 20 respectively loosely engage. The pins 20 are substantially parallel to the shaft 2, preferably correspond in number to the weighted spring arms 10, and are preferably equi-spaced about the axis of shaft 2. The pins 20 are also located a distance from the axis of shaft 2 much greater than the radius of said shaft.

With the construction described, it will be seen that by reason of the sliding connection between the pins 20 carried by the fixed collar 6 and the member 22 mounted on the slidable collar 8, relative turning or rotary movement of the sleeve 8 and shaft 2 and twisting of the spring arms 10, in the operation of the governor, are prevented. Due to the fact that the pins 20 are remote from the shaft 2, the pins may engage the openings 24 in the member 22 very loosely without permitting any appreciable turning movement of the collar 8 on shaft 2. Also because of the distance of the pins 20 from the shaft 2, a very slight lateral pressure of these pins against the walls of the openings 24 in member 22 will suffice to transmit rotary movement from the shaft 2 and collar 6 to the collar 8 and to overcome at all times during the operation of the governor, any tendency there may be for relative turning movement of the collar 8 and shaft 2. Consequently, the engagement of the pins 20 with the walls of the openings 24 in member 22 will result in but a very slight frictional resistance to sliding movement of the collar 8 on shaft 2 under the action of the centrifugal weights W, upon variations in speed of the governor, and the governor will accordingly be very sensitive to such variations in speed. Of course, the more remote the sliding connection between the pins 20 and the member 22 mounted on collar 8 from the shaft 2, the less will be the lateral pressure exerted in such connection to effect the results described. However, for practical reasons, I prefer to locate this sliding connection 8 at a distance from shaft 2 substantially the same as the weights W when the governor is at rest. Also while the means for preventing relative turning movement of the collar 8 and shaft 2 may comprise any desired number of the pins 20, it is preferable that these pins correspond in number to the weighted spring arms of the governor and that they be spaced equi-distant about the axis of the governor shaft, as this arrangement results in a more uniform action of the governor.

While I have specifically described a preferred embodiment of my improved governor, it is to be distinctly understood that the same is subject to various changes in the size, shape and arrangement of parts, without departure from the spirit of the invention or the scope of the appended claims.

Having now described my invention, what I claim as new and desire to protect by Letters Patent is as follows:

1. In a device of the character described, a governor shaft, a member slidably and freely mounted on said shaft, flexible weighted means fixed to and connecting said member and shaft, and means fixedly connected to said shaft and slidably connected with said member at a point remote from the shaft and acting to prevent relative rotary movement of said member and shaft, substantially as described.

2. In a device of the character described, a shaft member, a member slidably and freely mounted on said shaft member and having a friction brake surface, a plurality of weighted springs fixed at their ends respectively to said members, and means acting to prevent relative rotary movement of said members, said means being fixed to one of said members and having sliding connection with the other of such members at a point remote from the shaft member, substantially as described.

3. In a device of the character described, a governor shaft, a member slidably and freely mounted on said shaft and provided with a brake disk, flexible weighted means fixed to and connecting said member and shaft, and means acting to prevent relative rotary movement of said member and shaft fixed to one of said elements, namely, the member and shaft, and having sliding connection with the other of such elements at a point remote from the shaft, substantially as described.

4. In a device of the character described, a governor shaft, a member fixed to said shaft, a member slidably and freely mounted on said shaft and having a brake surface, flexible weighted means fixed to and connecting said members, and means fixed to one of said members and having sliding connection with the other member at a point remote from the shaft acting to prevent relative rotary movement of said members, substantially as described.

5. In a device of the character described, a governor shaft, a member fixed to said shaft, a member having a brake surface and slidably and freely mounted on said shaft, weighted spring arms extending longitudinally of the shaft and fixed at their ends to said members respectively, and means comprising a pin fixed to one of said members and having sliding connection with the other member at a point remote from the shaft acting to prevent relative rotary movement of said members, substantially as described.

6. In a device of the character described, a governor shaft, a member fixed to said shaft, a member slidably and freely mounted on said shaft, weighted spring arms extending longitudinally of the shaft and fixed at their ends to said members respectively, and means acting to prevent relative rotary movement of said members comprising a plurality of radially spaced pins corresponding in number to said spring arms and fixed to one of said members and having sliding connection with the other of said members at points remote from the governor shaft, said pins being substantially parallel to said shaft, substantially as described.

7. In a device of the character described, a governor shaft, a member slidably and freely mounted on said shaft and having a friction brake surface, flexible weighted means fixed to and connecting said member and shaft, and means fixedly connected to said shaft and movably connected with said member, said means being adapted to oppose turning movement of said member with respect to said shaft through a leverage appreciably greater than the radius of said shaft, substantially as described.

8. In a device of the character described, a governor shaft, a member slidably and freely mounted on said shaft, bowed spring arms fixed to and connecting said member and shaft, weights respectively mounted on said arms, and means fixedly connected to said shaft and movably connected with said member, said means being adapted to oppose turning movement of said member with respect to said shaft through a leverage substantially as great as the distance of said weights from the governor shaft, substantially as described.

9. In a device of the character described, a governor shaft, a member fixed to said shaft, a member slidably and freely mounted on said shaft, a plurality of weighted spring arms fixed to and connecting said members, each of said members being provided with radial portions extending outwardly between the adjacent spring arms respectively, and pins respectively fixed to the said radial portions of one of said members adjacent the outer ends of such portions, the radial portions of the other member being provided adjacent their outer ends with openings with which said pins respectively loosely engage, substantially as described.

10. In a device of the character described, a governor shaft, a member fixed to said shaft, a member slidably and freely mounted on said shaft, a plurality of weighted spring arms fixed to and connecting said members, each of said members being provided with radial portions extending outwardly between the adjacent spring arms respectively, and pins respectively fixed to the said radial portions of one of said members adjacent the outer ends of such portions, the radial portions of the other member being provided adjacent their outer ends with openings with which said pins respectively loosely engage, said pins being substantially parallel to said shaft and being substantially the same distance from the latter as the weights of said spring arms.

This specification signed this 12th day of November 1923.

THOS. A. EDISON.